(12) United States Patent
Powers et al.

(10) Patent No.: US 7,056,075 B2
(45) Date of Patent: *Jun. 6, 2006

(54) SCREW-TYPE ANCHOR

(75) Inventors: Jeffrey R. Powers, Larchmont, NY (US); Paul Gaudron, Stamford, CT (US)

(73) Assignee: Powers Fasteners, Inc., New Rochelle, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/377,627

(22) Filed: Mar. 4, 2003

(65) Prior Publication Data

US 2004/0175253 A1 Sep. 9, 2004

(51) Int. Cl.
*F16B 37/12* (2006.01)

(52) U.S. Cl. ............... 411/178; 411/403; 411/412
(58) Field of Classification Search ............ 411/109, 411/178, 386, 403, 404, 412, 413, 82, 82.1
See application file for complete search history.

(56) References Cited

U.S. PATENT DOCUMENTS

| 636,326 | A | * | 12/1899 | Farr ................... 101/382.1 |
| 2,560,951 | A | * | 7/1951 | Henderson ............... 52/705 |
| 2,643,573 | A | | 6/1953 | Johnson |
| 2,942,819 | A | | 6/1960 | Brogan |
| 3,117,486 | A | * | 1/1964 | Matthews ................. 411/417 |
| 3,190,169 | A | * | 6/1965 | Rosan ..................... 411/403 |
| 3,844,194 | A | * | 10/1974 | Reinwall, Jr. ............... 85/79 |
| 3,937,119 | A | * | 2/1976 | Ernst ..................... 411/422 |
| 4,015,504 | A | | 4/1977 | Rosan, Sr. et al. |
| 4,340,330 | A | | 7/1982 | Reidel |
| 4,637,539 | A | | 1/1987 | Turcott et al. |
| 4,730,970 | A | | 3/1988 | Hyner et al. |
| 4,818,165 | A | * | 4/1989 | Shirai .................... 411/178 |
| 4,822,223 | A | * | 4/1989 | Williams .............. 411/178 X |
| 4,856,951 | A | | 8/1989 | Blucher et al. |
| 4,973,210 | A | | 11/1990 | Osborne et al. |
| 5,082,405 | A | * | 1/1992 | Witten ..................... 411/82 |
| 5,263,804 | A | | 11/1993 | Ernst et al. |
| 5,653,563 | A | | 8/1997 | Ernst et al. |
| 5,755,542 | A | | 5/1998 | Janusz et al. |
| 5,957,646 | A | | 9/1999 | Giannuzzi et al. |
| 6,295,773 | B1 | * | 10/2001 | Alty ....................... 52/202 |
| 6,419,435 | B1 | | 7/2002 | Gaudron |
| 6,619,899 | B1 | * | 9/2003 | Gaudron .................. 411/386 |
| 6,676,352 | B1 | * | 1/2004 | Chen-Chi et al. ...... 411/310 X |
| 6,918,727 | B1 | * | 7/2005 | Huang ..................... 411/389 |
| 2004/0096291 | A1 | * | 5/2004 | Reiter .................... 411/178 |

FOREIGN PATENT DOCUMENTS

| DE | 1575180 | * | 1/1970 | ............ 411/178 |
| EP | 1 174 626 A1 | * | 1/2002 | |
| WO | WO 01/88387 | * | 11/2001 | |

* cited by examiner

*Primary Examiner*—Flemming Saether
(74) *Attorney, Agent, or Firm*—Morgan, Lewis & Bockius

(57) ABSTRACT

A self-tapping masonry anchor includes an axial bore that is formed at one end and extends through a portion of the anchor.

20 Claims, 3 Drawing Sheets

SCREW-TYPE ANCHOR

BACKGROUND OF THE INVENTION

Self-tapping masonry anchors are known in the art. One example of a self-tapping masonry anchor is disclosed in U.S. Pat. No. 4,973,210. This anchor has a cutting shaft 6 with an externally threaded fastening portion 5 (or a fastening portion 10 having an internally-threaded bore 11) and a cutting portion 6 having a raised external helix 7. The anchor is secured in a masonry hole by first forming a hole in the masonry and then driving the cutting portion 6 into the hole using an oscillatory rotating hammer blows. A key may be driven into a longitudinal slot 12 passing through the concrete, masonry or brickwork along a line of interruption in the raised helix embedded in the hole which is said to prevent the fastening from rotating or from being removed from the hole.

It would be desirable to have a self-tapping masonry anchor in which the anchor is securable in masonry by releasable engagement with a tool received within a bore of the anchor such that the tool may be easily removed from the bore after inserting the anchor in the masonry. It would also be desirable to have an anchor in which the external cutting thread is disposed within close proximity of the portion of the anchor in which an axial bore extends so that the anchor has a relatively short longitudinal extent, is securable in a relatively shallow hole and/or is secured with its exposed end flush with, or recessed within a masonry hole.

SUMMARY OF THE INVENTION

The above needs are met, and the shortcomings of prior art are overcome by the anchor of the invention. According to one embodiment, the anchor includes a helical thread of the type suited for tapping masonry, the thread extending from a first end to a first intermediate station disposed between the first and a second end of the anchor, an axial bore adapted for releasably engaging an anchor inserting tool, the bore being formed at the second end, extending into the anchor and terminating at a second intermediate station that is one of approximately coincident with the first intermediate station and between the first intermediate station and the first end. In this embodiment, the anchor may include a second engagement formed on the wall of the bore, the second engagement being disposed between the tool engagement and the second end and the tool engagement may correspond to a hex-type engagement.

In another embodiment, a method for forming a self-tapping masonry anchor from a cylindrical blank includes the steps of forming an axial bore extending from a first end and terminating at a first intermediate station disposed between the first end and a second end, and forming a thread by rolling, the thread extending from the second end to a second intermediate station, the second intermediate station being one of approximately coincident with the first intermediate station and between the first intermediate station and the first end. The bore may be cold forged, and the piece may be tapped by a cold rolling process.

In another embodiment, a method for inserting a self tapping masonry anchor in a masonry hole includes the steps of driving the anchor into the masonry hole until a second, exposed end is one of approximately flush with the hole opening and disposed below the hole opening, and then removing the tool from the bore. In this embodiment, a tool is inserted into a bore and engaged with the bore walls. The piece is then driven into the hole and then removed by pulling the tool straight out of the bore. Such a tool engagement may correspond to a female-hex.

In another embodiment, an anchor for coupling a mounting structure to masonry includes a solid portion that extends from a first end of the anchor and terminates at an intermediate station located between the first and a second end of the anchor, a hollow portion defined by an axial bore extending from the second end to the intermediate station, wherein a first bore portion defines a tool engagement for releasably engaging an anchor inserting tool, a second bore portion for releasably securing a structure to the anchor, and a helical thread of the type suited for tapping masonry, the thread extending over a length that is no less than approximately the longitudinal extent of the solid portion.

Additional features and advantages of the invention will be set forth or be apparent from the description that follows. The features and advantages of the invention will be realized and attained by the structures and methods particularly pointed out in the written description and claims hereof as well as the appended drawings.

It is to be understood that both the foregoing general description and the following detailed description are exemplary and explanatory and are intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of the invention. In the drawings.

DETAILED DESCRIPTION OF THE PREFERRED EMBODIMENTS

Anchors according to the invention will now be described in detail with frequent reference to preferred embodiments, such as anchor 10 illustrated in FIGS. 1–4. The invention is concerned with self-tapping masonry anchors that are securable in a pre-bored masonry hole. Once secured in the hole, the anchor may then be used to support structure, such as a pipe hanger, utility tray, ducts, lighting system, sprinkler system, electrical system, drop ceiling or refrigeration system. The anchor may be secured in a masonry hole of varying depth or diameter, have a varying length threading and may be formed to accommodate common fasteners for attaching structure, e.g., threaded fasteners, or even a custom fitting without departing from the scope of invention. In one embodiment, the exposed end of the anchor (i.e., the end that receives the mating structure) may be flush with the masonry surface, as in the example illustrated in FIG. 4. In other embodiments, the anchor may be sunken into the masonry hole or extend out from the hole.

Figure 1:
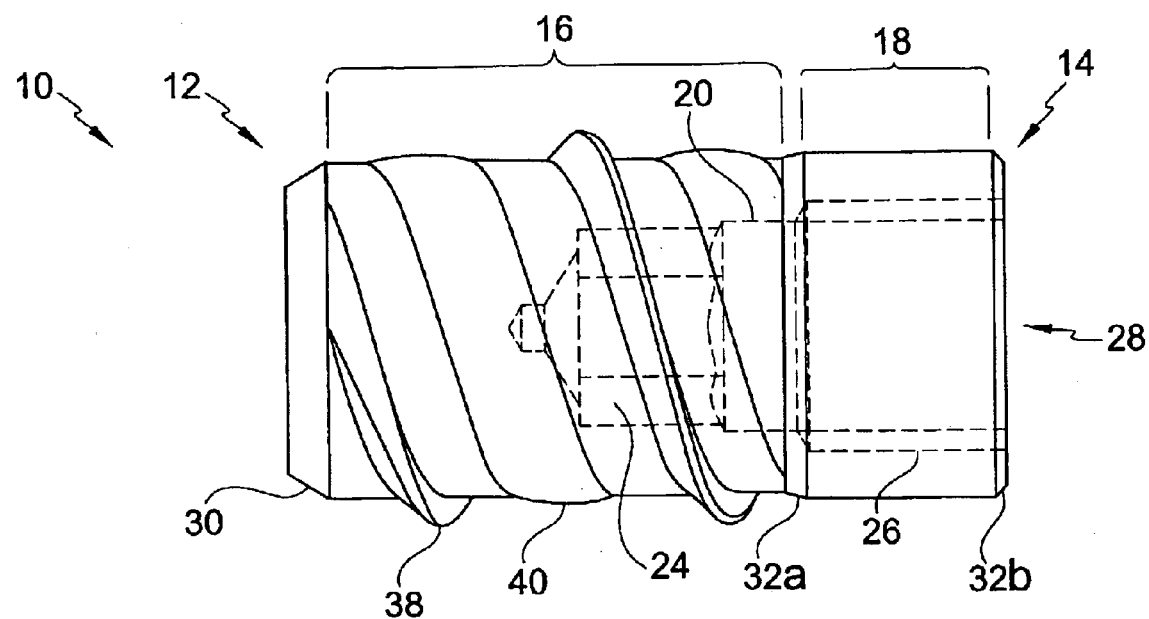
FIG. 1 is a planar view of a first embodiment of a self-tapping masonry anchor made in accordance with the principles of the invention.
Figure 2:
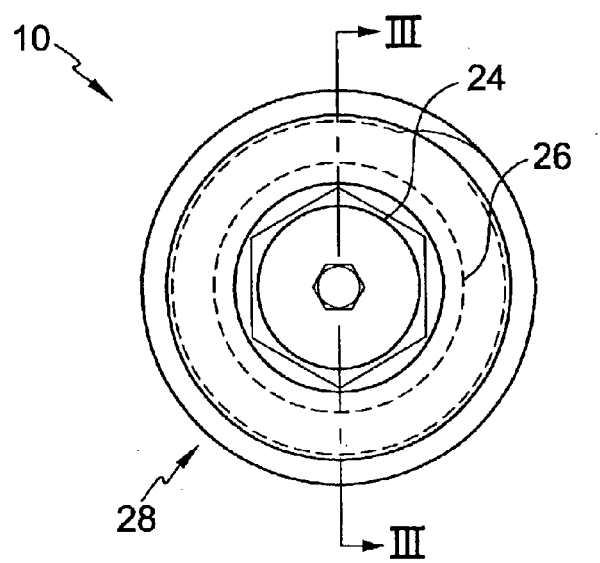
FIG. 2 is top view of the anchor of FIG. 1.
Figure 3:
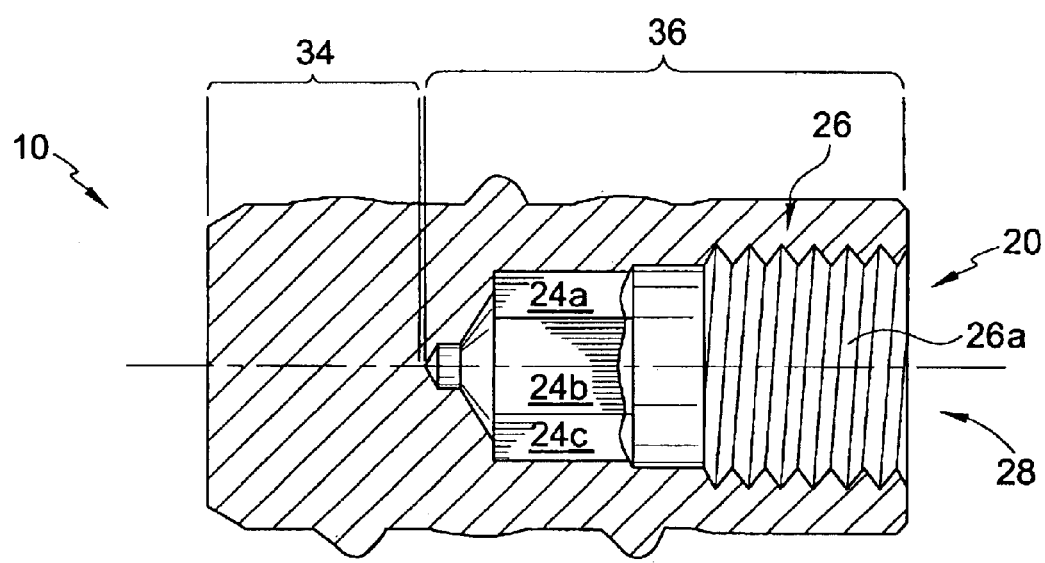
FIG. 3 is a planar cross-section view of the anchor of FIG. 1, taken at section III—III of FIG. 2.

Referring now to a preferred embodiment illustrated in FIGS. 1–4, anchor 10 is formed from a generally cylindrical stock metal and includes an external threaded portion 16 extending from a forward end 12 of anchor 10. An upper portion 18 extends from threaded portion 16 to fastening end 14. Anchor 10 includes a solid portion 34 and a hollow portion 36 whose longitudinal extent is defined by the length of a bore 20 extending from fastening end 14 towards forward end 12. Threaded portion 16 may extend over hollow portion 36, in addition to solid portion 34. Referring to FIGS. 2 and 3, bore 20 may be generally circular and includes a tool fitting 24 at one end and a fixture attachment 26, e.g., a helical thread 26a, at the opposite end adjacent opening 28 of bore 20.

A camfer 30 may be formed at forward end 12 to assist with aligning anchor 10 with the masonry hole. Camfers 32a, 32b are also preferably formed at fastening end 14 and at the junction of threaded portion 16 and upper portion 18. Referring to FIG. 3, which illustrates a cross-sectional slice of anchor 10 taken at section III—III in FIG. 2, tool fitting 24 is preferably formed into tool engagement surfaces that will reliably sustain high localized stresses resulting from torques applied by an anchor inserting tool, e.g. an oscillatory rotating hammer, hammer drill or impact wrench, as anchor 10 is driven into the masonry hole. In a preferred embodiment, tool fitting 24 corresponds to a female hex-type tool engagement, walls 24a, 24b, and 24c of which may be formed as shown in FIG. 3. A hex-type fitting is preferred as it is a common type of tool engagement. In other embodiments, tool fitting 24 may correspond to other types of engagements characterized by, e.g., longitudinally extending, opposed planar walls of appropriate depth for reacting torques required to tap masonry. It is preferred to have longitudinally extending so that the tool may be easily removed from bore 20 after anchor 10 is inserted into the masonry hole. In cases where, for example, tool fitting 24 is a helical thread, the tool may become locked in the bore. For this reason, it may be desirable to avoid using a helical thread for tool fitting 24. But it is not considered limiting on the invention that a particular type of tool engagement is used over another.

Threaded portion 16 is of the type that is suitable for self-tapping masonry, as opposed to soft material (e.g., wood, plastic) or metal. Examples of thread patterns suited for tapping masonry are described in U.S. Pat. No. 6,419,435 to Gaudron and U.S. Pat. No. 5,957,646 to Giannuzzi et al., the entire contents of which are incorporated by reference in their entirety for all purposes. In a preferred embodiment, threaded portion 16 includes a helical cutting thread 38, land 40, preferably formed as an arcuate, e.g., hemispherical, land, and a valley disposed between land 40 and cutting thread 38 and defining a root diameter of the threading. As described in the above references, as a self-tapping masonry anchor is driven into masonry, the debris accumulated from cutting into this friable material compacts in a compaction zone disposed between successive rows of the cutting thread. This compacted debris creates a frictional resistance between the anchor and the wall of the hole, which resists dislodgment of the anchor from the hole. Embodiments of the invention may have a hemispherical or planar land disposed between valleys which may be defined by a root diameter. The land may have a diameter that is equal to, or slightly less than the diameter of the hole so as to promote a frictional resistance between the anchor and the hole wall. Other types of masonry thread patterns may alternatively be used in place of the thread designs disclosed above. Accordingly, the invention is not limited to a particular type, or variety of self-tapping masonry thread.

The cutting thread of the anchor, e.g., thread 38, may define a maximum diameter of the anchor, such as when the anchor is designed to be driven into a constant diameter hole and the exposed end, e.g., fastening end 14, is flush with, or disposed below the masonry surface when the anchor is fully inserted into the hole. The maximum diameter of upper portion 18 is preferably sized to be the same as, or slightly less than the diameter of the masonry hole so that fastening end 14 may be positioned within the masonry surface. Land 40 may be sized to have a maximum diameter extent that is equal to, or slightly greater than the maximum diameter of upper portion 18.

Bore 20 preferably has a stepped diameter, with tool fitting 24 having a diameter that is slightly less than than the outer diameter of fixture attaching portion 26. A helical thread is preferably formed along the wall surface of fixture attaching portion 26 for engagement with a mating helical thread of the connecting structure. Other types of fastener engagements may be used in place of a helical thread.

Figure 4:
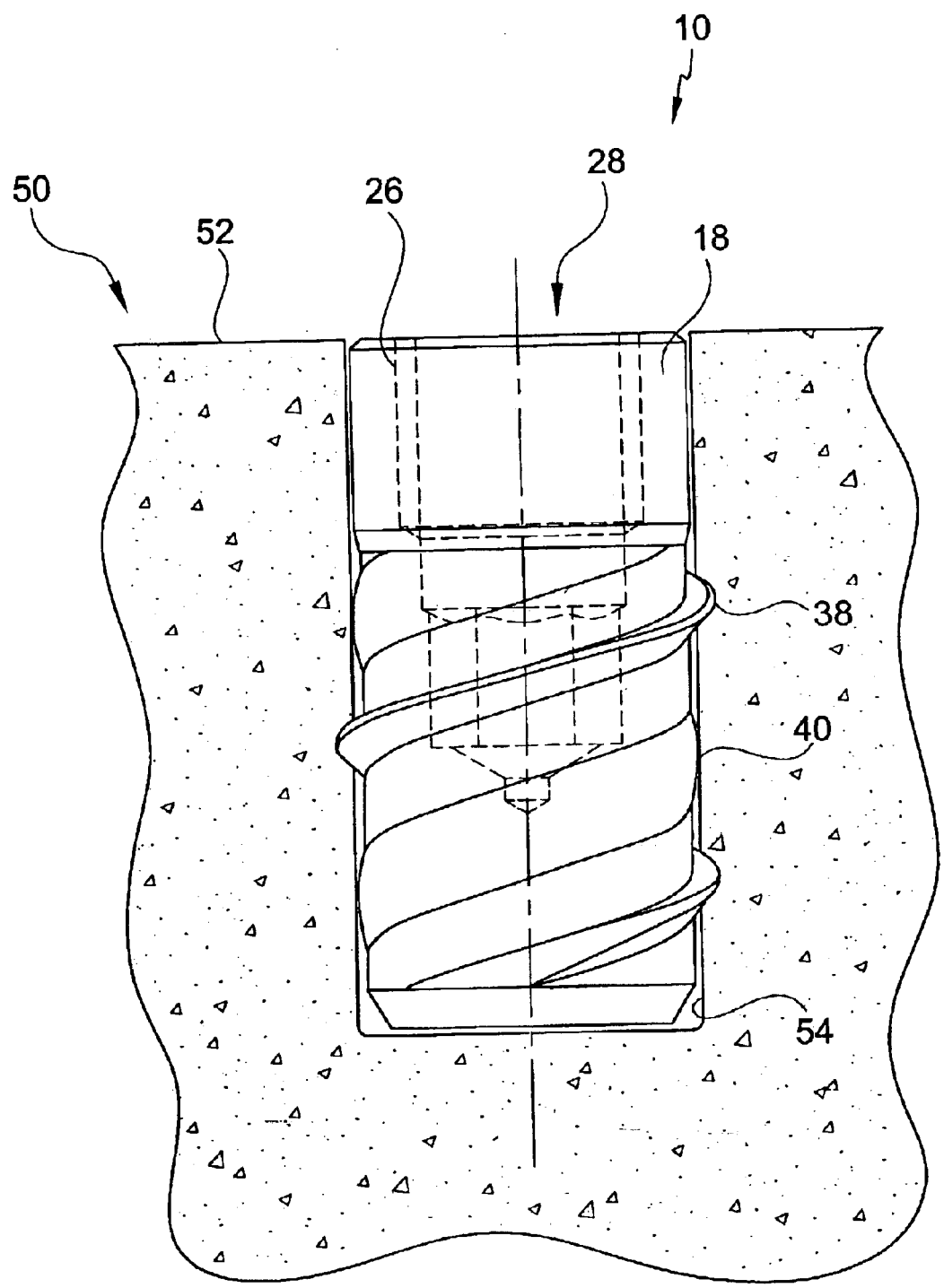
FIG. 4 is a planar view of the anchor of FIG. 1 embedded in masonry.

Referring to FIG. 4, anchor 10 is shown embedded in masonry 50 and engaged with walls 54 defining a pre-formed hole. In this preferred embodiment, hole has a depth that allows fastening end 14 to be positioned approximately flush with surface 52. Cutting thread 38 is engaged with walls 54 and the diameter of upper portion 18 is approximately the same diameter as the hole.

A preferred method for forming an anchor according to the invention uses cold forging. The steps include forming the bore of the anchor by drawing the piece using a punch press, followed by a second tool that taps the outer surface using a rolling pin. The Fixture attaching portion, e.g., a helical thread, is then formed along an inner wall of the bore.

Although the foregoing description is directed primarily to preferred embodiments of the invention, it is noted that other variations and modifications will be apparent to those skilled in the art, and may be made without departing from the spirit or scope of the invention.

We claim:

1. A compact anchor for embedding in a pre-drilled masonry or concrete hole comprising:

a forward end and an opposite rear end defining an axial length;

an external helical cutting thread for tapping the masonry or concrete hole;

a solid portion extending from approximately the forward end towards the rear end for at least part of the length of the anchor;

a hollow portion extending from the rear end towards the forward end for at least part of the length of the anchor, the hollow portion comprising:

(a) a threaded fixture attaching portion configured and adapted to secure a structure to the anchor, and (b) a tool engagement portion adjacent the fixture attaching portion, the tool engagement portion configured and adapted to engage an anchor inserting tool for providing rotational torque to the anchor;

an axially-broad arcuate land having a radial height and disposed between successive rows of the helical cutting thread for wedging the anchor into the pre-drilled masonry or concrete hole, the land having an axial length at least twice its height and configured to abrade the hole for wedging the anchor therein when inserted; and a valley disposed on either side of the land between the land and the cutting thread defining a root diameter to axially space apart the land and the cutting thread.

2. The anchor of claim 1, wherein the tool engagement portion is configured as a female hex socket.

3. The anchor of claim 1, wherein the fixture attaching portion is disposed adjacent to and penetrates the rear end of the anchor.

4. The anchor of claim 3, wherein the cutting thread does not extend over the fixture attaching portion.

5. The anchor of claim 1, wherein the anchor is formed by cold forging.

6. The anchor of claim 1, wherein the axial length being less than three times the root diameter of the anchor.

7. The anchor of claim 1, further comprising the fixture attachment portion and tool engagement portion each having a diameter, the diameter of the fixture attachment portion being larger than the diameter of the tool engagement portion.

8. The anchor of claim 1, wherein the forward end of the anchor has a blunt shape with a flat forward surface.

9. The anchor of claim 1, wherein the cutting thread makes less than two helical convolutions around the circumference of the anchor.

10. The anchor of claim 1, wherein the cutting thread extends over the solid portion and tool engagement portion.

11. The anchor of claim 1, wherein the cutting thread is formed by cold rolling.

12. The anchor of claim 1, wherein the fixture attachment portion has a smooth external surface without any threading.

13. A compact anchor in combination with a pre-drilled masonry or concrete hole having a predetermined diameter, the combination comprising:
   a forward end and an opposite rear end defining an axial length;
   an external helical cutting thread for tapping the masonry or concrete hole, the thread having a diameter larger than the diameter of the hole;
   a solid portion extending from approximately the forward end towards the rear end for at least part of the length of the anchor;
   a hollow portion extending from the rear end towards the forward end for at least part of the length of the anchor, the hollow portion comprising:
   (a) a threaded fixture attaching portion configured and adapted to secure a structure to the anchor, and
   (b) a tool engagement portion adjacent the fixture attaching portion, the tool engagement portion configured and adapted to engage an anchor inserting tool for providing rotational torque to the anchor, and
   an axially-broad arcuate land disposed between successive rows of the helical cutting thread for wedging the anchor into the pre-drilled masonry or concrete hole a valley disposed on either side of the land between the land and the cutting thread defining a root diameter to axially space apart the land and the cutting thread the land having an axial length at least twice its height and a diameter which is sized to be installed into the masonry or concrete hole.

14. The anchor of claim 13, further comprising a flat shank portion on either side of the land.

15. The anchor of claim 13, further comprising the rear end of the anchor being approximately flush with or recessed below an entrance of the hole in the masonry or concrete.

16. The anchor of claim 13, wherein the tool engagement portion is configured as a female hex socket.

17. The anchor of claim 13, wherein the fixture attaching portion is disposed adjacent to and penetrates the rear end of the anchor.

18. The anchor of claim 13, wherein the axial length being less than three times the root diameter of the anchor.

19. The anchor of claim 13, further comprising the fixture attachment portion and tool engagement portion each having a diameter, the diameter of the fixture attachment portion being larger than the diameter of the tool engagement portion.

20. The anchor of claim 13, wherein the cutting thread makes less than two helical convolutions around the circumference of the anchor.

* * * * *